United States Patent [19]

Hoffmann et al.

[11] Patent Number: 4,869,708
[45] Date of Patent: Sep. 26, 1989

[54] SPROCKET RETENTION/CHAIN GUIDE ASSEMBLY

[75] Inventors: Peter D. Hoffmann, Ithaca; Franklin R. Smith, Slaterville-Springs, both of N.Y.

[73] Assignee: Borg-Warner Transmission and Engine Components Corporation, Ithaca, N.Y.

[21] Appl. No.: 181,994

[22] Filed: Apr. 15, 1988

[51] Int. Cl.$^4$ ............................................. F16H 7/18
[52] U.S. Cl. ................................... 474/140; 474/144
[58] Field of Search ................. 474/140, 151, 144–147, 474/111, 165; 74/608; 180/84; 280/152 R, 159, 160; 123/198 E

[56] References Cited

U.S. PATENT DOCUMENTS

| | | | |
|---|---|---|---|
| 551,811 | 12/1895 | Curtis | 474/147 |
| 4,193,314 | 3/1980 | Horner et al. | 474/140 |
| 4,642,073 | 2/1987 | Restelli | 474/140 X |

FOREIGN PATENT DOCUMENTS

| | | | |
|---|---|---|---|
| 2051050 | 4/1972 | Fed. Rep. of Germany | 474/146 |
| 2069656 | 8/1981 | United Kingdom | 474/140 |

Primary Examiner—Thuy M. Bui
Attorney, Agent, or Firm—Robert L. Zieg; James J. Jennings; James A. Geppert

[57] ABSTRACT

A sprocket retention/chain guide member for use in the timing drive mechanism for an internal combustion engine where a timing chain acts to rotate the engine camshaft from the crankshaft and time the opening and closing of the inlet and exhaust valves for the engine cylinders based on reciprocation of the pistons. The retention/guide member is adapted to be mounted on the front of the engine block and has oppositely disposed arcuate grooves loosely receiving the crankshaft and camshaft sprockets and guide channels on each side of the member acting as snubbers for the chain. The member, chain and sprockets form a subassembly for shipping and ease of assembly on the block with the sprockets being received on the crankshaft and camshaft. Also, a chain tensioner may form a portion of one guide channel.

11 Claims, 3 Drawing Sheets

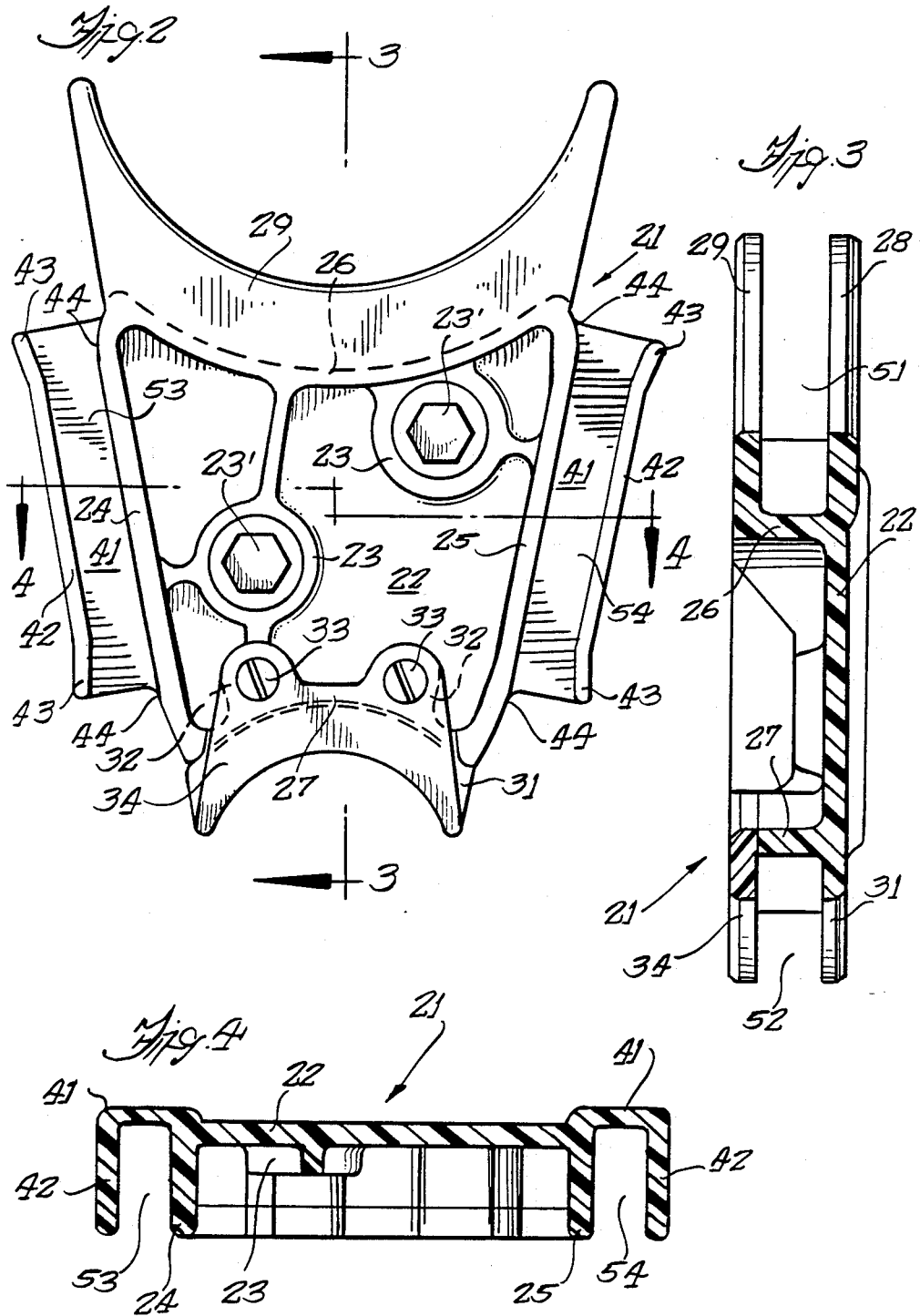

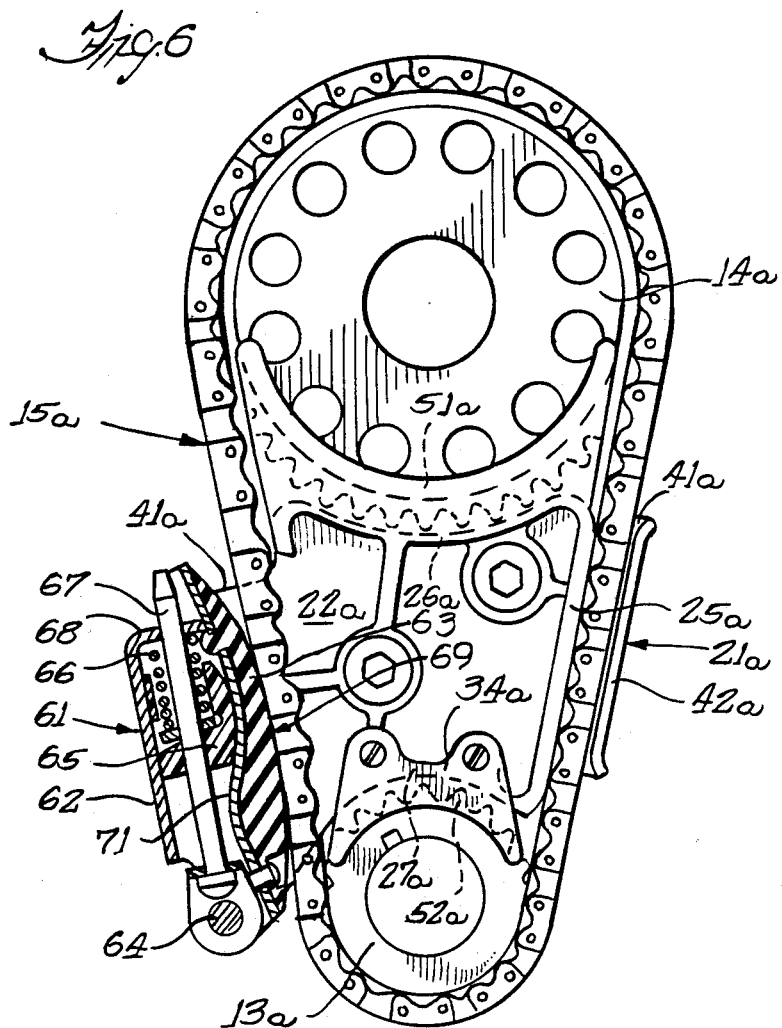

SPROCKET RETENTION/CHAIN GUIDE ASSEMBLY

BACKGROUND OF THE INVENTION

The present invention relates to a sprocket retention and chain guide member for a timing chain on an internal combustion engine. Currently on a vehicle engine assembly line, each individual part of the timing drive mechanism must be assembled onto the engine separately. Care must be taken to ensure that the two sprockets and timing chain are installed in the correct positional relationship to each other in order to attain the necessary timing parameters. Thus, a costly and time consuming series of operations are necessary to correctly assemble the timing drive mechanism onto the engine. The present invention simplifies and reduces the operations for this assembly procedure.

SUMMARY OF THE INVENTION

The present invention relates to a novel sprocket retention and chain guide member aiding in the shipping and assembly of the timing drive mechanism for a vehicle engine which removes time constraints and quality issues by allowing all timing chain system parts to be installed at once in a pre-timed relationship. The member provides arcuate grooves or channels loosely receiving the crankshaft sprocket and camshaft sprocket and the timing chain and retaining these elements as a pre-timed subassembly for shipping. This subassembly is assembled as a unit on the engine block, with the member suitably secured to the block and the sprockets received onto and secured to the ends of the crankshaft and camshaft.

The present invention also relates to a sprocket retention and chain guide member which provides improved chain guidance and stability. The member provides snubbing for the chain in two opposite areas on both sides of the chain. The chain and sprockets are assembled and retained in a pre-timed relationship.

The present invention further relates to a sprocket retention and chain guide member which provides chain guidance and tensioning. A snubber is provided on one edge of the member for the chain extending between the sprockets and a chain tensioning device is provided at the opposite edge of the member engaging the other length of chain between the sprockets. The chain and sprockets are assembled and retained in a pre-timed relationship for ease of assembly onto the engine block.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an elevational view of the retention/guide member.

FIG. 3 is a vertical cross sectional view of the guide member taken on the line 3—3 of FIG. 2.

FIG. 4 is a horizontal cross sectional view of the guide member the irregular line 4—4 of FIG. 2.

FIG. 6 is an end elevational view of a second sprocket-chain-guide configuration.

DESCRIPTION OF THE PREFERRED EMBODIMENTS

Figure 1:
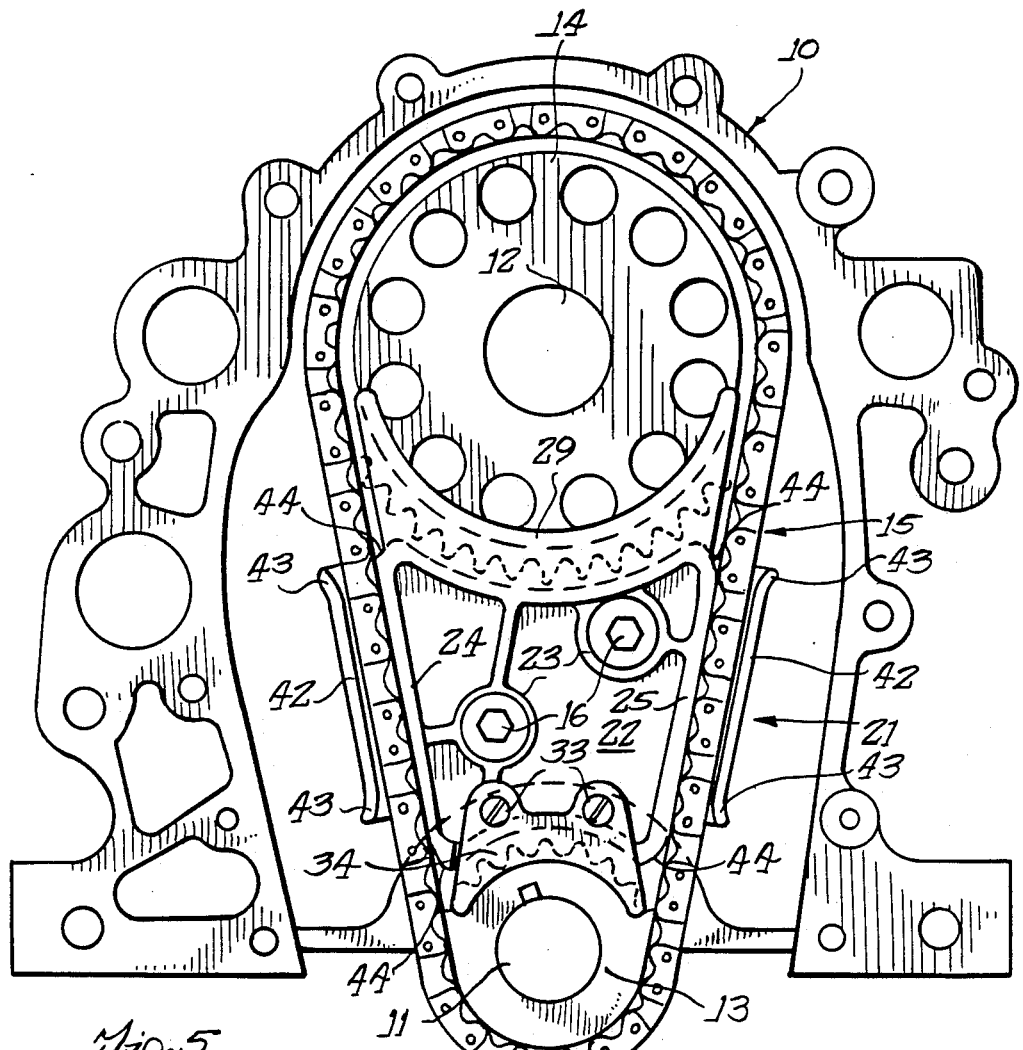
FIG. 1 is an end elevational view of an engine block with one possible sprocket-chain-guide configuration assembled thereon.

Referring more particularly to the disclosure in the drawings wherein are shown illustrative embodiments of the present invention, FIG. 1 discloses an engine block 10 for an internal combustion engine having a crankshaft 11 and a camshaft 12 projecting from the end of the block. A crankshaft sprocket 13 is secured to the end of the crankshaft 11 and a camshaft sprocket 14 is secured onto the end of the camshaft 12; the sprocket 14 having twice as many teeth as the sprocket 13 for a four-cycle engine. Obviously this device could be utilized with a two-cycle engine, either gasoline or diesel, with appropriate sprockets. A timing chain 15 extends between and encircles a portion of both sprockets. Conventionally, rotation of the crankshaft results from reciprocation of the pistons in the cylinders in the block 10 during the combustion process and causes rotation of the camshaft resulting in timed actuation of the inlet and exhaust valves for each cylinder for the internal combustion operation.

Figure 5:
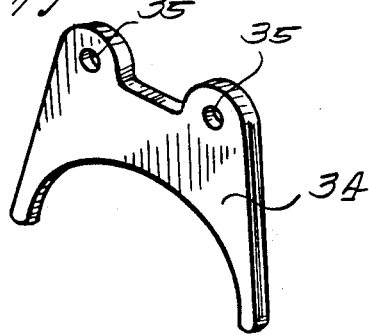
FIG. 5 is an enlarged perspective view of a removable plate on the guide member.

Mounted on the block by suitable means, such as bolts 16, is a sprocket retention/chain guide member 21 formed of a metal or a suitable plastic, such as "ZYTEL", or a combination thereof having a generally planar body 22 having a generally trapezoidal shape with openings 23' defined by circular bosses 23 which, if plastic, contain a metal insert, the bosses receiving the mounting bolts 16. Side flanges 24 and 25 and arcuate end flanges 26 and 27 are formed on the periphery of the body 22. Extending outwardly from the upper arcuate flange 26 are a pair of generally parallel sprocket retention flanges 28 and 29; the flanges 26, 28 and 29 acting to define a groove 51 loosely receiving the camshaft sprocket 14. Also, extending from the lower arcuate end flange 27 is a retention flange 31 in substantially the same plane as the body 22 and flange 28. The end flange 27 is formed of a lesser height than flange 26 and is provided with internally threaded bosses 32,32 to receive suitable mounting means, such as screws 33. A removable flange plate 34 (FIG. 5) is secured to the flange 27 by the screws 33 received in bosses 35.

Extending from the side flanges 24, 25 in generally the same plane as body 22 are oppositely extending bottom flanges 41, 41 terminating in upwardly extending guide walls 42, 42 generally parallel to the side flanges 24, 25; each guide wall having opposite outwardly slightly curved end edges 43, 43 acting as chain snubbers. Also, the flanges 24 and 25 are curved inwardly at 44 which also act as snubbers.

This member 21 allows all of the timing chain components to be assembled in a pre-timed relationship. Thus, the sprocket 14 is loosely received in the arcuate groove 51 formed by end flanges 26, 28 and 29; the timing chain 15 is engaged on both sprockets 13 and 14 and received in the channels 53, 54 defined by flanges 41 and walls 42; and the sprocket 13 is received in the arcuate groove 52 formed of flanges 27 and 31 and the removable plate 34 secured to end flange 27 by screws 33. Obviously, any other suitable means of attachment can be utilized to secure the plate 34 to the end flange 27.

The sprockets 13 and 14 and timing chain 15 are loosely retained together by the member 21 as a subassembly in the pre-timed relationship for shipping or storage. For assembly on an engine, the subassembly is positioned so that the sprockets 13 and 14 are mounted on the ends of the crankshaft 11 and the camshaft 12, respectively, and the member 21 is attached to the block 10 by bolts 16. Therefore, the sprockets and timing chain are assembled with the member 21 as a unit onto the engine block in a pre-timed relationship to simplify installation. The member 21 provides snubbing of the chain 15 in two opposite areas on both sides of the chain as the chain comes off of either sprocket 13 or 14.

FIG. 6 discloses an alternate embodiment of sprocket retention/chain guide member 21a for use on an engine block with chain tensioning means. Like parts in this embodiment will be accorded the same reference numeral with the addition of a script a. An engine block has suitable openings to bolt the member 21a thereon when the unit is assembled. The sprocket retaining and guide member 21a is utilized with a crankshaft sprocket 13a, camshaft sprocket 14a and timing chain 15a and includes a generally planar body 22a with upstanding arcuate opposite end flanges 26a and 27a and a side flange 25a, an upper groove 51a receiving a portion of sprocket 14a and a lower groove 52a receiving a portion of sprocket 13a. A removable plate 34a is secured to the flange 27a and is removable to allow assembly of the sprockets and chain onto the member.

A chain snubber is formed from a base flange 41a and side wall 42a generally paralleling the side flange 25a on one side of the member, and a chain tensioning means 61, such as shown in U.S. Pat. No. 4,395,251, is mounted on an extension of flange 41a on the opposite side of the member 21a. The chain tensioning means 61 includes a bracket mounted on flange 41a with side and back walls 62, a chain contacting arm 63 formed of a suitable plastic, which may have a metal backing, that is pivoted in the bracket on a pin 64. An axially movable cam block 65 mounted on an elongated guide rod 67 engage the inner surface 71 of the arm 63; the pin being secured at one end in the bracket adjacent the pivot pin 64 and the opposite end projecting through an end wall 68 of the bracket. A compression spring 66 encompasses the elongated rod 67 with one end bearing against end wall 68 and the opposite end engaging the cam 65.

In operation, the surface 69 of arm 63 slidably contacts the timing chain 15a between the sprockets, and the spring 66 yieldably biases the cam 65 to remain in engagement with the curved inner surface 71 of the arm 63. As the chain wears and/or elongates, the spring biases the cam along the rod to continuously urge the arm 63 into contact with the chain, thus retaining a pre-determined tension in the chain. The member 21a acts to retain the sprockets 13a and 14a and timing chain 15a as a subassembly and for ease of assembly on the engine block, crankshaft and camshaft.

Having thus disclosed the present invention, We claim:

1. A sprocket retention and chain guide member comprising a body adapted to be mounted on an engine block, said member having a pair of oppositely disposed arcuate grooves adapted to loosely receive portions of a pair of sprockets, said member having a generally trapezoidal shape with concave arcuate ends formed of a pair of arcuate end flanges and elongated chain guide channels, the first end flange having a pair of parallel flanges extending therefrom forming a groove with said first end flange, a pair of parallel flanges forming an oppositely disposed second groove with the second end flange, and a removable plate forming one of said last mentioned parallel flanges, said pair of guide channels receiving a timing chain extending between and partially encompassing the sprockets.

2. A sprocket retention and chain guide member as set forth in claim 1, wherein said removable plate is secured to said member by suitable securing means.

3. A sprocket retention and chain guide member as set forth in claim 1, including chain tensioning means on one side of said member opposite a chain guide channel.

4. A sprocket and timing chain subassembly for a vehicle engine timing system, comprising a crankshaft sprocket, a camshaft sprocket, a continuous timing chain engaging both sprockets and a retention and guide member receiving said sprockets and timing chain to retain the subassembly together, said member including an arcuate groove adapted to receive a portion of the camshaft sprocket, an oppositely disposed arcuate groove adapted to receive a portion of the crankshaft sprocket, a pair of elongated converging guide channels receiving portions of the timing chain extending between said sprockets and acting as snubbers for the chain leaving either sprocket, and a removable plate forming a portion of one groove to allow the chain and sprockets to be assembled to said member.

5. A sprocket and chain subassembly as set forth in claim 4, wherein chain tensioning means is located along one side of said member opposite to a chain guide channel.

6. A sprocket and chain subassembly as set forth in claim 4, wherein said member is centrally positioned relative to said chain and sprockets.

7. A sprocket and chain subassembly as set forth in claim 4, wherein said sprockets and chain are loosely retained on said member for storage and shipping.

8. A sprocket and chain subassembly as set forth in claim 4, including means on said member for mounting onto a engine block with the sprockets being received on and secured to the crankshaft and camshaft of the engine.

9. A method of assembling the sprockets and timing chain of a timing drive mechanism onto a vehicle engine having a crankshaft and camshaft, comprising the steps of providing a retainer and guide member having oppositely disposed arcuate grooves and a pair of guide channels, assembling a timing chain loop around a crankshaft sprocket and a camshaft sprocket, assembling the sprockets and chain onto said member with a portion of the crankshaft sprocket received in one arcuate groove, a portion of the camshaft sprocket received in the opposite groove and the timing chain between the sprockets received in said pair of channels to form a subassembly, and mounting the sprockets on the ends of the crankshaft and camshaft and attaching the member on the engine.

10. A method of assembling as set forth in claim 9, including assembling said sprockets and timing chain on said member in a pre-timed relationship.

11. A method of assembling as set forth in claim 9, including the step of tensioning the chain when the assembly is mounted on the engine.

* * * * *